Feb. 11, 1969   H. J. ROSE ETAL   3,427,169
CASING FOR DRY SAUSAGES

Filed Dec. 23, 1965    Sheet 1 of 2

HENRY J. ROSE
ALBIN F. TURBAK
INVENTORS

BY *their Attorney*

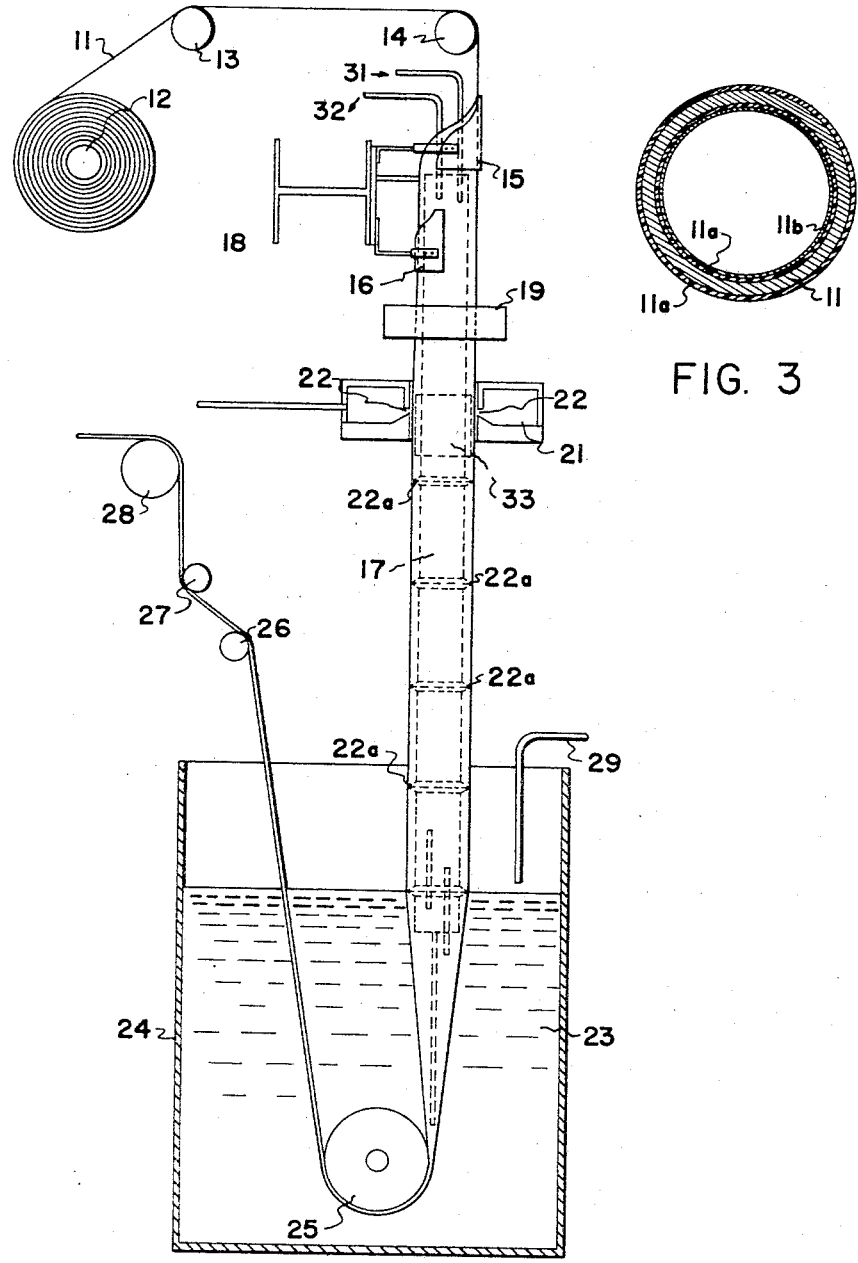

United States Patent Office 3,427,169
Patented Feb. 11, 1969

3,427,169
CASING FOR DRY SAUSAGES
Henry J. Rose and Albin F. Turbak, Danville, Ill., assignors to Tee-Pak, Inc., Chicago, Ill., a corporation of Illinois
Continuation-in-part of application Ser. No. 394,817, Sept. 8, 1964. This application Dec. 23, 1965, Ser. No. 515,952
The portion of the term of the patent subsequent to Dec. 26, 1984, has been disclaimed
U.S. Cl. 99—176    3 Claims
Int. Cl. A22c 13/00

ABSTRACT OF THE DISCLOSURE

A casing for the preparation of dry sausages, which is resistant to mold or fungus growth, is prepared by coating the inner surface of a synthetic tubular casing with a soluble protein which is insolubilized by liquid smoke and which contains 0.1–5.0% sorbic acid or potassium sorbate or sodium sorbate. The protein used in the coating composition has a molecular weight above about 10,000 and is added in a solution in a concentration of 0.1–5.0% and containing 0.05–5.0% liquid smoke, based on the weight of the casing being treated, to substantially insolubilize the protein coating after drying. The treatment is preferably given to regenerated cellulose casings and especially to fiber-reinforced regenerated cellulose casings. The treated casing with the insolubilized proteinaceous coating adheres to the surface and shrinks with the dry sausages which are processed therein. The sorbic acid or potassium sorbate or sodium sorbate in the composition prevents mold or fungus growth on the surface of the casing during the processing of dry sausages.

---

Figure 1:
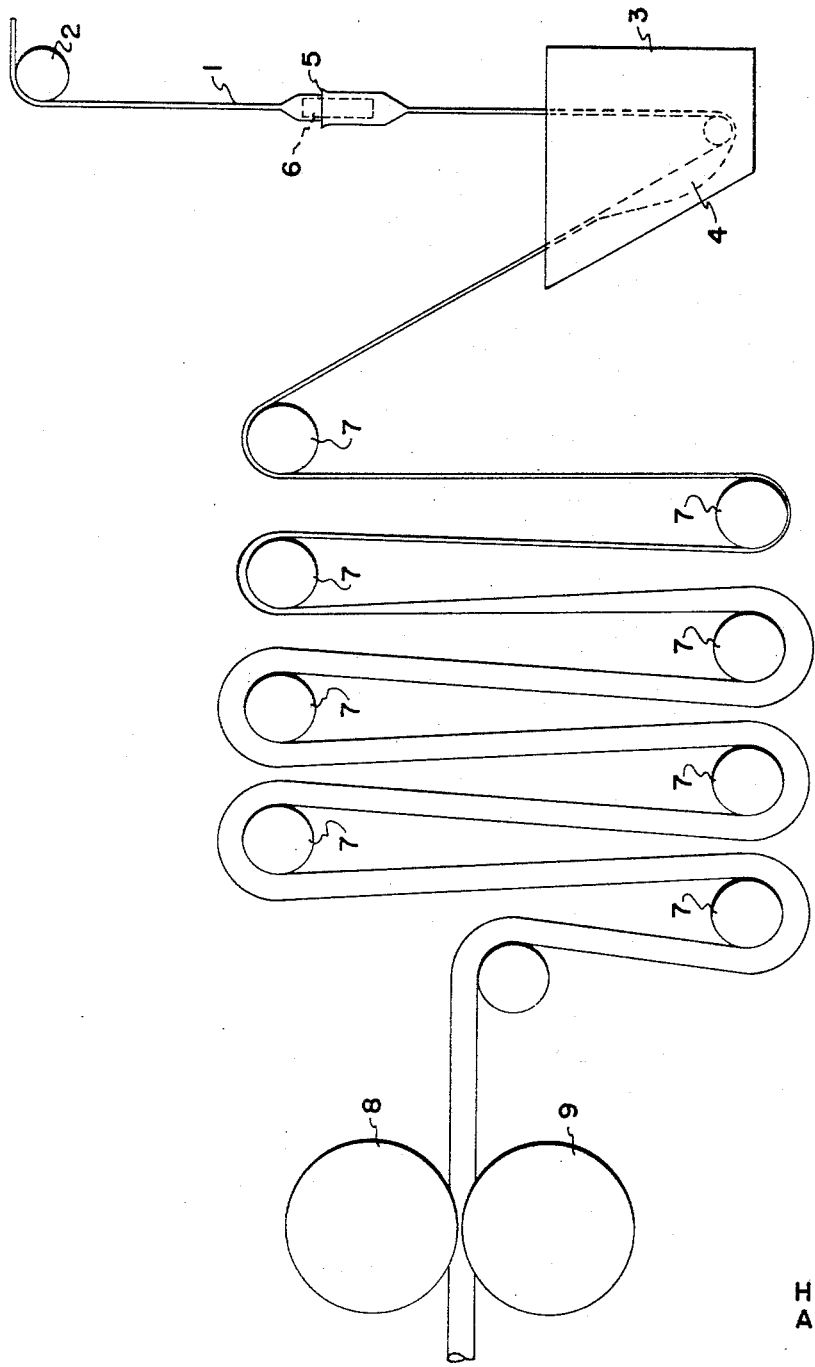

This application is a continuation-in-part of the co-pending application of Henry J. Rose and Albin F. Turbak, Ser. No. 394,817, filed Sept. 8, 1964, now U.S. Patent 3,360,383, issued Dec. 26, 1967.

This invention relates to new and useful improvements in casings for the preparation of dry sausages and more particularly to such casings having an improved composition which results in an improved adherence of the casing to a dry sausage and protects both the casing and sausage against deterioration resulting from mold growth thereon.

Dry sausage, of which the various salamis and cervelats are prime examples, is conventionally processed by drying rather than by cooking, hence the name. Dry sausage is ordinarily served cold, without further cooking by the consumer.

The manufacture of dry sausage customarily involves mixing the desired proportions of fat and lean meats, beef or pork, with selected spices, seasonings, and curing materials to form a sausage emulsion which is initially cured at a relatively low temperature. The curing of dry sausages is normally carried out at a temperature just a few degrees above freezing (e.g. 36–38° F.) for 2 or 3 days depending upon the size of the meat particles so that they will be preserved sufficiently to be smoked and dried.

The chill-cured sausage meat emulsion is then firmly packed into casings of suitable size and shape, and the ends of the casing are tied, ready for delivery, drying room, or smokehouse, depending upon the type of sausage being manufactured. A smoked dry sausage is first smoked and then dried, while an unsmoked dry sausage is dried only. The drying or curing time varies with the particular type of sausage being processed and to some extent with the processing conditions. Ordinarily, 60–90 days is considered a minimum processing time and periods of 120–180 days or more are used in the processing of dry sausages under certain circumstances.

The processing of dry sausage is described fully in "Sausage and Ready-to-Serve Meats," published by the American Meat Institute. The term "dry sausage" as used herein includes the entire range of dry and so-called semi-dry sausages. The semi-dry sausages include the thuringer cervleats which are dried for about 10 days (other semi-dry sausages may be dried as short a time as 2–6 days). Dry sausage is usually sold in 3 different forms, viz. new sausage or semi-dry sausage, about 10–25 days after smoking (the sausage having about 20% shrinkage), medium dry sausage, about 30–60 days after smoking (said sausage having about 32% shrinkage), and dry sausage, about 60–90 days or more after smoking (the sausage having about 40% shrinkage).

Previously, the sausage meat emulsions were stuffed into casings formed of natural materials or animal products such as sewn beef middles and hog casings. More recently, considerable interest has been developed in utilizing certain synthetic materials out of which casings could be formed. Particularly, the industry has turned to the use of casings formed of regenerated cellulose per se or of the product known in the art as fibrous casing and which is composed of cellulosic or other fibers impregnated and held together by regenerated cellulose.

The use of such synthetic materials is not only desirable because of the greater control over the supply that can be exercised in keeping with the rapid growth and demand of the various packaged or encased meat products, but also the materials can be conventionally synthesized and extruded into seamless tubular form of preselected diameter. Most importantly, casings formed of the aforementioned fibrous material, unlike the natural product can be made sufficiently flexible as well as durable to be advantageously used in the stuffing step, while also being sufficiently nonelastic that they will not stretch out of shape during or subsequent to stuffing, but will maintain a more constant shape and size corresponding to that to which it was initially fabricated.

These properties, of course, permit a definite relationship to be established between the number of slices of the sausage and weight which may be assembled as a unit, and are obviously highly desirable characteristics in mechanical high-speed packaging methods employed today. In addition, the cellulosic casings are much more sanitary than natural casings, and are more economical to use where they do not require tying with strings to maintain their shape.

It has been found, however, that fibrous cellulosic casings are subject to several disadvantages in their utilization for the processing of dry sausages. One of the main drawbacks of such casings is their lack of ability to shrink with the sausage during the drying of the sausage emulsion. Another disadvantage is the susceptibility of the casing to mold attack by molds which are commonly present in the preparation and processing of dry sausages. In the preparation of dry sausages, the sausage tends to shrink away from cellulosic casings and leave gaps between the meat and the casing in which there is a tendency for mold and/or so-called brown ring to develop. This trouble is not encountered where the natural casings are used since natural casings tend to expand and contract with the sausage during curing. Similarly, natural casings do not deteriorate in the presence of mold and are thus not subject to the weakening which occurs with mold attack on cellulosic casings.

It is therefore one object of this invention to provide a new and improved cellulosic casing which adheres to a dry sausage and follows the shrinkage of the sausage during curing and which is especially resistant to mold attack.

A further object of this invention is to provide a method of treating a sausage to cause the same to adhere to the sausage and follow the shrinkage thereof during curing and to resist attack by mold growth thereon.

Still another object of this invention is to provide a method of coating casings of regenerated cellulose materials to cause the same to adhere to meat encased therein so that the casing will follow the shrinkage of meat during curing and to incorporate in the finshed casing a material which will resist attack by mold.

Yet another object of this invention is to provide an improved coating composition for application to regenerated cellulose casings.

A feature of this invention is the provision of a regenerated cellulose casing of tubular shape or a blank for formation of a regenerated cellulose casing of tubular shape having a protein, such as gelatin, on the inner surface thereof, treated with a liquid smoke and a mold inhibiting composition, such as sorbic acid or salts thereof, to insolubilize the protein and provide mold resistance therein, whereby the casing shrinks with and adheres to the surface of dry sausages processed therein and provides mold resistance to the casing and the dry sausage.

Another feature of this invention is the provision of a process for the manufacture of dry sausages in which a cellulosic casing is provided with an internal coating of a protein such as gelatin and treated with liquid smoke and a mold-inhibiting composition, such as sorbic acid or salts thereof, to provide an insolubilized mold-resistant coating within the casing, said coating being applied prior to stuffing of the casing with meat, whereby the casing will adhere to and shrink with a dry sausage composition during drying and eliminate substantially the problem of mold growth and brown ring formation on the resulting sausage.

Another feature of this invention is the provision of a casing for dry sausage preparation having an inner surface coated with gelatin and liquid smoke and impregnated with sorbic acid or salts thereof.

Other objects and features of this invention will become apparent from time to time throughout the specification and claims as hereinafter related.

SUMMARY OF THE INVENTION

In recent years, regenerated cellulose casings, both fibrous and nonfibrous types, have been made and sold commercially for use in the manufacture of dry sausages. These casings have been coated on their inner surfaces with a thin layer of gelatin which is effective in causing the casing to adhere to a dry sausage emulsion and follow the shrinkage of the sausage during curing. Gelatin coated regenerated cellulose casings of this type, however, are subject to the disadvantage that the gelatin is often lost in the presoaking of the casing. Also, the gelatin and the cellulose are subject to attack and degradation by mold during the processing of the sausages. As a result, there has been a substantial failure of adhesion of casings to dry sausages during processing and the deterioration of the casing due to mold formation thereon, both of which have resulted in the production of unsatisfactory sausage products. The loss of gelatin during the presoaking can be offset to some extent by application of a heavier gelatin coating. The thickness of the gelatin coating, however, is determined largely by the concentration of gelatin in the solution used to coat the casing and the coatings which have been used commercially are at a maximum practical thickness. Up to this time, however, there has been no practical means for overcoming the effect of mold attack on the casing and on the gelatin coating thereof.

This invention is based upon the discovery that regenerated cellulose casings, including regenerated cellulose films, paper reinforced cellulose casings, both in flat form and in tubular form, can be treated with a soluble protein such as gelatin and a liquid smoke and a mold inhibitor such as sorbic acid or salts thereof, to produce a casing which adheres to dry sausages to follow the shrinkage of the sausage during curing and which is resistant to formation of mold on the sausage or on the casing. During the heating and drying of the casing after treatment with gelatin or other protein material and liquid smoke and sorbic acid or salts thereof, the protein is substantially insolubilized by reaction with some of the ingredients in the liquid smoke. As a result, a much smaller amount of the protein is lost during the presoaking of the casing with the result that the coated casings are almost totally effective in adhering to dry sausages during curing and the resulted product is highly resistant to mold formation thereon.

Where the protein used is gelatin, the incorporation of liquid smoke into the coating composition also provides certain additional advantages in the preparation of the casing. It has been found that the incorporation of liquid smoke into gelatin solutions render such solutions more fluid and less likely to gel for extended periods of time. This enables one to coat the interior of casings, as is subsequently described, over an extended period of time without danger of gelation of the coating solution. It has also been found that the incorporation of substantial amounts of liquid smoke into a gelatin coating is effective to prevent brown ring formation which occurs occasionally in the preparation of dry sausages. Likewise, the incorporation of sorbic acid or salts thereof in the coating composition is effective to render the casing and the sausage stuffed therein resistant to mold growth.

In carrying out this invention, any of the soluble proteins having molecular weights above about 10,000 and an isoelectric point in the range from about pH 2 to pH 6 may be used. These soluble proteins include, but are not limited to, the albumins, globulins, glutelins, prolamines, prolines, hydroxy prolines, histones, elastins, and protamines. Typical examples are egg albumin, edestin, glutenin, procollagen, gelatin, gliadin, etc.

In carrying out this invention, the liquid smoke which is used is an aqueous solution of the essential soluble components of wood smoke which is obtained by washing a wood smoke or by fractionating a wood smoke and absorbing the nontoxic flavoring ingredients into an aqueous solution. The liquid smoke is prepared by burning a suitable wood, preferably maple or hickory, sawdust on a hot plate in a limited amount of air. The smoke is drawn through a settling chamber where ash and heavy tars drop out and it is then dissolved in water. The smoke solution is further processed by filtration and attains a concentration of about 4–8% in acetic acid. The solution has a phenolic content (dimethoxyphenol) of about 40–80 mg./ml., and a pH of about 2.15. Liquid smoke consists of a solution and/or suspension in water or other suitable solvent (including nonaqueous solvents such as vegetable oils and mineral oils) of substantially all of the coloring and flavoring ingredients of natural wood smoke with only the ash, heavy tars, and other particulate matter removed. Liquid smoke has been approved for use in foods by the United States Food & Drug Administration and by the Meat Inspection Division of the United States Department of Agriculture.

In coating tubular cellulose sausage casings, both unreinforced and fibrous types, an aqueous solution is used containing 0.1–5.0% soluble protein, such as gelatin, and 0.05–5.0% liquid smoke. The concentration of smoke is expressed on a percentage basis based on the amount of smoke ingredients in the solutions which are applied onto the casing by addition of the specified percentage of the liquid smoke as an aqueous (or nonaqueous) solution. The sorbic acid or sorbic salts used to protect the casing and the sausage processed therein from mold attack may be added as an aqueous solution in association with the coating solution or may be added with the glycerol or other plasticizer used for softening and plasticizing the casing.

It has also been found that the incorporation of a small amount, e.g. 0.05–1.0% of an insoluble nontoxic powder, in the coating solution will result in powder being fixed in the resulting coating and functioning as an anti-blocking agent for the internal surface of the casing. Powdered materials which may be used in the coating composition include wood flour, starch, walnut shell flour, chalk, talc, powdered mica, graphite, calcium phosphate, calcium carbonate, etc.

In carrying out this invention, an aqueous solution containing 0.1–5.0% soluble protein, such as gelatin, and 0.05–5.0% liquid smoke is applied to the ultimate meat contacting surface of the casing (or sheet material from which the casing is to be formed) so that an amount in the range from about 0.1–5% of the protein and 0.05–5.0% of the liquid smoke is coated on the casing. As noted above, the coating composition may include 0.05–1.0% of walnut shell flour or starch or other powder as an anti-blocking agent. The coating can be applied to the casing in any desired manner. Thus, application to conventional regenerated cellulose casing, fibrous casing, or any other kind of casing can be made by coating the inside surfaces of the tubular casing by a technique which involves the use of a slug or bubble of aqueous solution, emulsion, or suspension of the coating ingredients inside the tube. In this method of coating, the casing moves while the slug or bubble of liquid remains still, with the result that the inner surface of the casing is wetted and coated and then moves on beyond the slug or bubble to a casing dryer. As previously noted, the sorbic acid or sorbate salts may be added to the casing with the glycerol or other plasticizer used in the preparation of the casing or may be added as a component of the coating solution. During the drying step, the liquid smoke reacts with the protein to insolubilize it without detracting from the properties of promoting adhesion to the surface of dry sausage when processed in the casing. The insolubilization of the protein also functions to retain the sorbic acid or sorbate salts dispersed throughout the casing and the coating.

The coating technique is better illustrated in the following description of the bubble coating method as applied to a commercial production line of either regenerated cellulose tubing or casing or paper reinforced casing which is known in the trade as fibrous casing.

In the accompanying drawings, to be taken as a part of this specification, there is clearly and fully illustrated a preferred embodiment of this invention, in which drawings, FIG. 1 is a diagrammatic view illustrating the formation of an internal coating in sausage casing prior to its introduction to a dryer, FIG. 2 is a diagrammatic view illustrating the formation of the fibrous casing prior to the coating step carried out in FIG. 1, and FIG. 3 is a sectional view, somewhat exaggerated, of the coated casing.

BUBBLE COATING PROCEDURE

Referring to FIG. 1 of the drawings, casing which may be wet fibrous casing or wet regenerated cellulose casing 1 is transferred from a bath (not shown) in which the casing has been washed after being impregnated with viscose followed by regeneration, or in the case of regenerated cellulose casing, after regeneration (both of these being well known processes for the preparation of fibrous or clear regenerated cellulose casing) into a slack box 3 by passage over rolls 2. The last wash through which the casing passed may have been a plasticizing bath containing glycerol or other plasticizer and 0.1–5% sorbic acid (or a sorbate salt such as sodium sorbate, potassium sorbate, etc. in the same proportion, calculated as sorbic acid). Between the rolls 2 and slack box 3, an aqueous solution containing 2% gelatin (or other soluble protein) and 2% liquid smoke (either Solu-smoke or Charsol brands may be used) is placed within the casing 1, the solution being introduced through cut 5 in casing 1 before rubber couplers 6 are tied into the casing.

The solution can be made by mixing gelatin with cold tap water and allowing the gelatin to swell for about ½ hour. To this mixture there is added hot tap water with agitation and heating to 50° C. for a period of 5 minutes. There is then added an amount of liquid smoke solution equal to the weight of the gelatin used. The batch is stirred and maintained at 45–50° C. This solution is stable against gelling for periods of up to 16 hours. If desired, the casing may be plasticized by incorporation of up to 20% glycerol in the solution at this point. Also, if the last wash bath or plasticizing bath for the casing does not contain sorbic acid or a soluble sorbate salt, the sorbic acid or soluble sorbate salt (such as sodium sorbate, potassium sorbate, etc.) may be added in an amount ranging from about 0.1–5% of the gelatin-liquid smoke coating solution.

A preferred coating composition consists of tap water containing 2% gelatin and 2% liquid smoke and may optionally include up to 20% glycerol and 0.1–5.0% sorbic acid (or a soluble sorbate salt such as sodium sorbate or potassium sorbate). The liquid smoke performs several functions in the coating composition. Liquid smoke is effective to maintain the gelatin solution fluid and resistant to gelling for extended periods of time (e.g. up to 16 hours or more). It is also effective, after drying, to fix the gelatin coating on the casing and to render it substantially insoluble to prevent appreciable loss of gelatin during presoaking of the casing just prior to use. The sorbic acid or sorbic salts which are incorporated either in the coating composition or in the plasticizing bath add sufficient sorbic acid or sorbate salt to the casing to prevent mold growth in the gelatin, on the casing, or on the surface of sausages processed therein.

The slug or bubble 4 of the coating solution lies at the bottom of slack box 3, and as casing 1 moves as shown, the interior of casing 1 is progressively contacted with slug or bubble 4, and is forced open to conform to the configuration of the bubble. The slug or bubble is refilled with additional solution as it becomes depleted, preferably at intervals of 1 or 2 hours.

The casing 1 then passes over additional rollers 7 which are subjected to a drying atmosphere, air being maintained within casing 1, as shown, for size control. Casing 1 then passes through idler roll 8 and drive wheel 9 into a dryer (not shown) where it is further dried at a temperature of about 200° F. for a period of 5–15 min. In this last drying step, the coating ingredients become firmly attached to the inner surface of the casing and the gelatin is insolubilized as previously described. In the drying step, the sorbic acid or sorbate salts are fixed within the casing and the coating.

This procedure is effective to apply a coating of 0.1–5.0% gelatin (based on weight of the casing) and smoke ingredients corresponding to 0.05–5.0% liquid smoke, inside the casing, together with about 0.1–5% sorbic acid or sorbate salts dispersed throughout the casing.

The coated casing is shown in an exaggerated cross section in FIG. 3. The paper 11 is coated with regenerated cellulose layers 11a and provided with an inner coating 11b as described above.

The drying time and temperature are interdependent factors insofar as effecting the drying of the casing and the nature of the resulting film are concerned, as will be apparent to those skilled in the art. Other combinations of time and temperature besides those illustrated above, can be used, provided, of course, that the temperature is not so high and the time not so long that the casing itself or the coating film is injured.

When other soluble proteins are used in the coating solution, drying times and temperatures are selected which are appropriate for the particular protein. For best results, temperatures of about 175° to 225° F. or higher should be used.

Under the above described conditions, a number of runs were made, using fibrous casing as the casing being treated, as follows:

Example 1

Various casings were coated on the inside, and dried using the above described application technique, the coating being accomplished using a solution containing 2% gelatin, 2% liquid smoke (either Solu-smoke or Charsol brand), and 0.2% corn starch together with 1% potassium sorbate (calculated as sorbic acid). The coated casings were easy to open as a result of the anti-blocking action of the starch particles in the coating.

The casings were presoaked in hot water according to standard commercial practice and were stuffed with salami emulsion. The stuffed casings were cured over a period of 6–8 weeks at a temperature of 50° F. and a relative humidity of 70%. Over this extended period of time there was very substantial shrinkage of the sausage as the sausage emulsion was cured and in each case the casing adhered to and followed the shrinkage of the sausage so that there was no separation of the casing from the sausage. The casings which contained both gelatin and liquid smoke in the coating were found to strip from the sausage with the normal tendency to pull away meat. The potassium sorbate in the casing functions as a mold inhibitor and there is essentially no mold attack on either the casing or the surface of the sausage processed therein.

In several months of commercial use of fibrous casing prepared and used in this manner, it has been found that the casings adhere to and follow the shrinkage of the sausage during curing while untreated casings are largely ineffective and subject to the objections previously discussed. Casings prepared in this manner have been found to be unexpectedly improved in appearance. Stuffed sausages were found to have a much higher gloss which may be related to improved adhesion. It has also been found that casings which are prepared as described above, incorporating both gelatin, potassium sorbate (or sodium sorbate or sorbic acid) and liquid smoke in the coating, lose only a very small proportion of the gelatin coating, e.g., about 10%, while casings which have been coated with gelatin alone can lose up to 90–95% of the coating during the presoaking period. Casings have been prepared as described above using potassium sorbates in amounts ranging from 0.1–1.0% in the gelatin-liquid smoke coating composition. At this level of potassium sorbate in the coating composition the sorbate is present in the casing in the range from about 180–3000 p.p.m. (calculated as sorbic acid and based on total cellulose in the casing).

Casings were also made by a similar process in which the sorbic acid was added to the casing as part of the glycerol plasticizer system prior to coating of the casing with the gelatin-liquid smoke coating solution. Potassium sorbate was added in amounts ranging from 0.1–1.0% in the glycerol solution used for plasticizing the casing. In these experiments the sorbate was retained in the casing in amounts ranging from 1600 to 25,000 p.p.m. (calculated as sorbic acid and based on total celloulose).

Example 2

A coating solution is prepared by mixing 2% egg albumin and 2% liquid smoke into cold tap water. If desired, up to 20% glycerol may be included in the solution to assist in plasticizing the casing and the coating, together with 0.1–5.0% potassium sorbate (or sodium sorbate or sorbic acid). Nut shell flour in the amount of 0.05–1.0% may be included in the composition to provide a nonblocking coating.

This coating solution is applied to regenerated cellulose casing (either fibrous or nonfibrous type) by the bubble coating procedure described above. This coating procedure is effective to apply a coating of 0.1–5% albumin, 0.05–5.0% liquid smoke and 0.1–5% potassium sorbate inside the casing. After drying, the coating is substantially insoluble in water, adherent to dry sausage during processing, and resistant to mold formation.

Example 3

A coating composition is prepared by mixing 2% glutenin and 2% liquid smoke into cold tap water. If desired, up to 20% glycerol and 0.1–5% potassium sorbate may be included in the solution to assist in plasticizing the casing and the coating and to provide resistance to mold attack.

This coating solution is applied to regenerated cellulose casing (either fibrous or nonfibrous type) by the bubble coating procedure described above. This procedure is effective to apply a coating of 0.1–5.0% glutenin, 0.05–5.0% liquid smoke, and 0.1–5.0% potassium sorbate inside the casing. After drying, the coating is substantially insoluble in water, adherent to dry sausage during processing, and resistant to mold formation thereon.

Coating of fibrous casing during forming.—Another technique for application of coatings of protein and liquid smoke to the inside of casings is by application of the coating to the inside of fibrous casing as the latter is being produced in accordance with well known procedures. Fibrous casing is made by passing a ribbon of paper around a mandrel to form a tube. Viscose is applied to the outside of the paper tube and between the overlapped portion thereof which is to become a seam. The viscose impregnated tube is then passed through a coagulating and regenerating bath wherein regeneration of the viscose takes place. The paper tube containing regenerated cellulose is then washed and then dried. The praparation of fibrous casing in this manner is described in U.S. Patents 1,937,225 and 2,045,349.

Referring to the schematic drawing shown in FIG. 2, a ribbon of paper 11 of the type described in U.S. Patent 2,045,349 (preferably a long fiber hemp paper weighing about 12½ lbs./ream) passes from rool 12 over rollers 13 and 14 and around formers 15 and 16 which form the paper into tubular form, then proceeds downwardly over mandrel 17. Mandrel 17, which may be a steel tube having an outside diameter of 2–7 in., more or less, depending on the size of the tube or casing which is to be produced, may be of any suitable length, conveniently about 30 ft. long, and, as shown, can be suspended from a suitable support such as an H beam 18 or the like. Paper 11, now shaped in the form of a tube, passes downwardly over mandrel 17, through a forming ring 19 which is a metallic ring having an inside diameter slightly larger than the diameter of the tube shaped paper passing through it, which functions to maintain the paper in a tubular form until it reaches the coating die 21. Coating die 21 is essentially a hollow ring structure made of metal or the like and contains an annular opening 22 circumferentially of its inside diameter through which viscose, which is contained under positive pressure in the chamber of the die 21, is applied to the outer surface of the downwardly extending paper tube to coat it uniformly with viscose. A sleeve 33, formed of metal or the like, which is shrunk onto mandrel 17 functions to effect a more uniform application of viscose through the orifice 22 as paper 11 passes downwardly thereover. A number of slip rings 22a, which may be shrunk onto mandrel 17 every 3 ft. or thereabouts, and which are made of metal or the like, serve to keep the inside wall of the viscose impregnated paper tube from scraping against the outside wall of mandrel 17, as the tube moves downwardly.

As the viscose impregnated paper tube moves downward it enters a coagulating bath 23 of 5–8% sulfuric acid (which may contain additional salts, e.g. sodium sulfate or ammonium sulfate) contained in a suitable vessel 24. Upon contact with the acid, the viscose is coagulated and begins the conversion to regenerated cellulose. Regeneration of cellulose continues as the tube moves around roller 25, over and under wiper rods 26 and 27, roller 28, and then through washing bath and drying tunnels, not shown here, but being similar to those used in the art of making regenerated cellulose casings as exemplified in U.S. Patent 1,937,225 and related patents.

Acid for bath 23 is supplied through pipe 29. The same kind and concentration of acid is supplied to the inside of the viscose impregnated paper tube through the interior of mandrel 17 through pipe 31. Spent acid is removed through pipe 32 at a rate which is balanced by the incoming acid as shown. The viscose impregnated paper tubing moves downwardly through the process at a rate of approximately 20 ft. per minute so that the contact time in the acid coagulating and regenerating bath is of the order of 50 sec.

In applying the coating of gelatin (or other soluble protein) and liquid smoke to the inside of the casing such as that shown and described above, the coating mixture may be incorporated with the inlet acid which enters at pipe 31. The gelatin-liquid smoke solution is quite unstable in strong acid and must be bled into the acid stream just prior to the point of coagulation or extrusion of the viscose. A preferred composition consists of 0.1–5.0% gelatin and 0.05–5.0% liquid smoke in the acid solution (to which 0.1–5.0% potassium sorbate may be added, if desired).

In addition to the foregoing techniques for applying coatings of gelatin and liquid smoke to the inside surfaces of casing, such coatings can also be applied to the surface or surfaces of cellulosic sheets per se before they are formed into tubes. For example, sheets of cellulose impregnated fibrous sheeting can be treated in accordance with the present invention by applying to the surface thereof a coating of gelatin and liquid smoke from solution, suspension, or emulsion, in an amount sufficient to uniformly coat the surface with 0.1–5.0% gelatin and 0.05–5.0% liquid smoke. As described in connection with the other coating techniques, potassium sorbate (or sorbic acid or sodium sorbate) may be added in amounts ranging from about 0.1–5.0% in admixture with the coating solution or in the glycerol solution used to plasticize and soften the cellulose film or cellulose coated fibrous web.

After drying, the gelatin is substantially insolubilized. After this treatment, the sheeting can be formed into a tube by any conventional technique. Additional coating may be applied to the sheet after it has been impregnated with cellulose and the coating may be applied to the sheet material in a bath through which the sheet passes prior to being dried. The coating can also be applied to the sheet after it has been washed and dried.

It is seen from the above description that the technique of this invention results in the production of unexpectedly superior fibrous and regenerated cellulose casings with respect to the performance characteristics of such casings when used in the preparation of dry sausages. The casings adhere to the meat and follow the meat as it shrinks during processing and provides superior resistance to mold formation on the casings or on the sausages processed therein. The coatings which are applied within the casing do not adversely affect the desirable permeability characteristics of the casing with respect to moisture vapor, smoke, dyeing, and the like.

As described above, the coating of gelatin and liquid smoke, together with impregnation with potassium sorbate (or sorbic acid or sodium sorbate) is effective to cause the casing to adhere to dry sausage during curing so that the casing will not separate as the sausage shrinks during the curing process. The potassium sorbate (or sorbic acid or sodium sorbate) prevents mold attack on the casing or on the gelatin or protein coating thereof or on the sausage being processed in the casing.

While this invention has been described with special emphasis upon the treatment of ordinary regenerated cellulose and fibrous casing, it will be seen that it is also applicable to coating the inside surfaces of casings whose outside surfaces are coated with Saran or other polymer compositions, such as the casings described in U.S. Patents, 2,812,259, 2,627,471, 2,627,483, and the like, as well as casing made from other suitable casing films, e.g. alginates, amylose, polyvinyl alcohol, etc., both of the unreinforced and fibrous types.

While this invention has been described fully and completely with special emphasis upon certain preferred embodiments, it should be understood that within the scope of the appended claims the invention may be practiced otherwise than as specifically described herein.

What is claimed is:

1. The synthetic tubular sausage casing for processing dry sausages, said casing having the inner surface thereof coated with 0.1–5.0% soluble protein, having a molecular weight above about 10,000, and an isoelectric point in the range from pH 2 to pH 6, and sufficient liquid smoke in the range from about 0.05–5.0% by weight of the casing to substantially insolubilize the protein coating after drying, and containing 0.1–5.0% sorbic acid or potassium sorbate or sodium sorbate, whereby the casing shrinks with and adheres to the surface of dry sausage therein and is resistant to mold formation thereon.

2. A synthetic tubular sausage casing as defined in claim 1 wherein the casing material is regenerated cellulose or fiber reinforced regenerated cellulose.

3. A sausage casing as defined in claim 2 wherein the soluble protein is gelatin.

References Cited

UNITED STATES PATENTS

| | | | |
|---|---|---|---|
| 2,979,410 | 4/1961 | Parlour | 99—174 X |
| 3,026,206 | 3/1962 | Williams. | |
| 3,360,383 | 12/1967 | Rose et al. | 99—176 |
| 3,361,577 | 1/1968 | Simon et al. | 99—176 |

HYMAN LORD, *Primary Examiner.*

U.S. Cl. X.R.

99—109